Jan. 10, 1961    A. G. DEAN    2,967,915
MOUNTING FOR THIRD RAIL SHOE ASSEMBLY
Filed Oct. 31, 1956    3 Sheets-Sheet 1
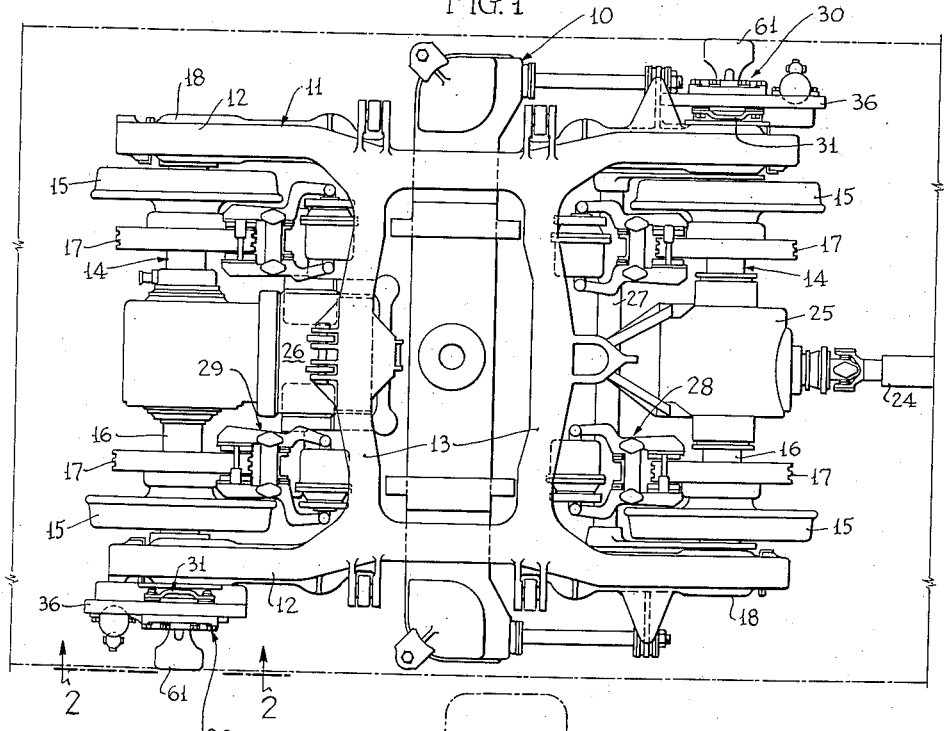
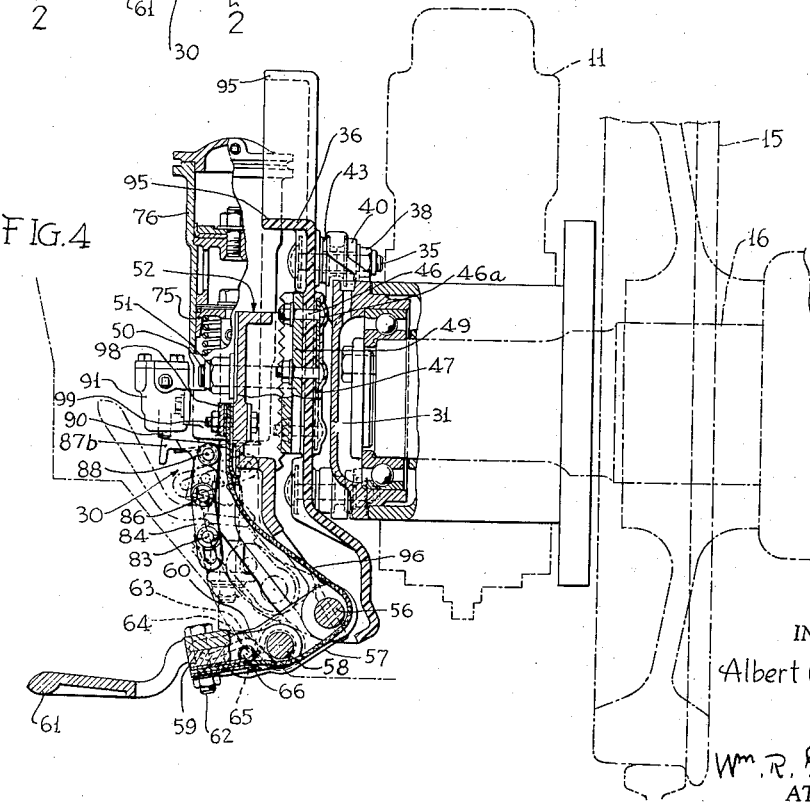
INVENTOR
Albert G. Dean
Wm. R. Glisson
ATTORNEY

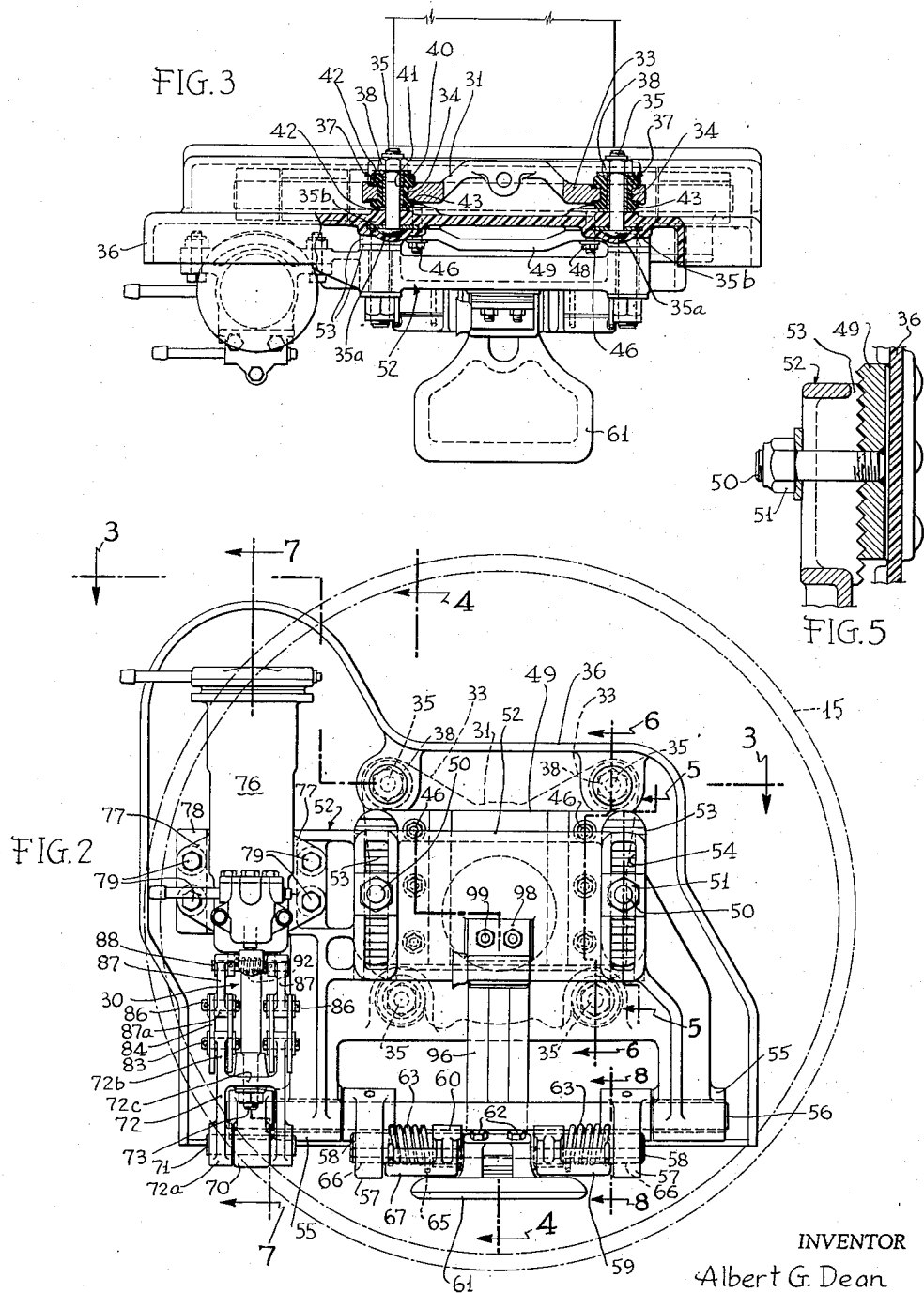

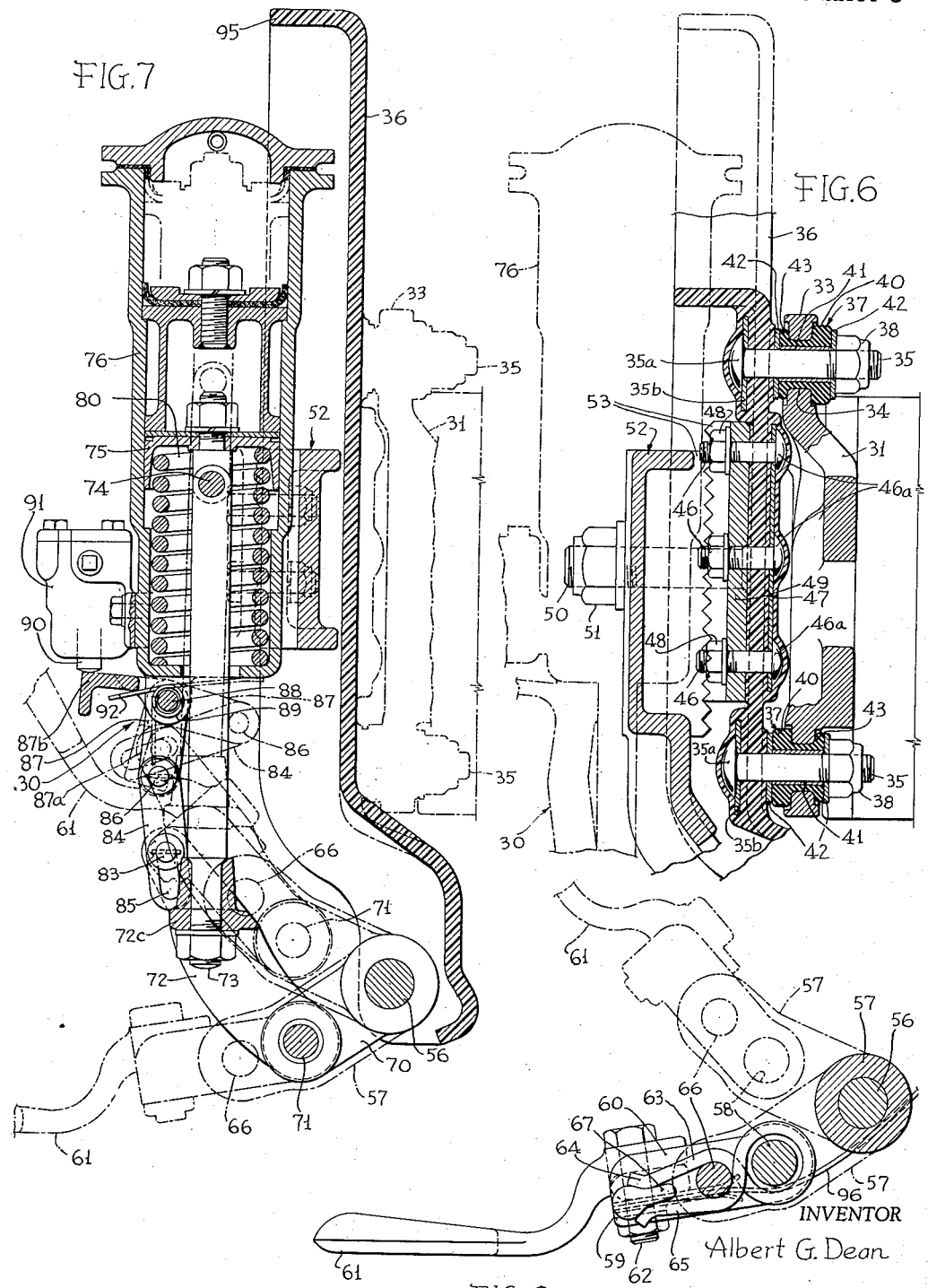

United States Patent Office 2,967,915
Patented Jan. 10, 1961

2,967,915

MOUNTING FOR THIRD RAIL SHOE ASSEMBLY

Albert G. Dean, Narberth, Pa., assignor to The Budd Company, Philadelphia, Pa., a corporation of Pennsylvania Filed Oct. 31, 1956, Ser. No. 619,539

3 Claims. (Cl. 191—49)

This invention relates to a mounting for a third rail shoe assembly, as on a railway vehicle truck, and has for an object the provision of improvements in this art.

In the operation of railway vehicles on mixed trackage, partly electrified with a third rail and partly non-electrified, there is provided a power device under the control of the train operator for moving the third rail shoe between its active and inactive positions. The shoe and its operating mechanism impose considerable loads on the supports and in addition there are heavy electrical currents which require safe insulation. To satisfy these conditions it has been the practice to mount the shoe assembly on a heavy wooden beam supported between two adjacent fore and aft journal boxes, the large wooden beam providing both the necessary support strength and the required electrical insulation for the shoe assembly.

For vehicle equipment heretofore used the beam mounting support has been feasible and satisfactory because there has been adequate space between journal boxes to take the support and shoe assembly and without placing any metal parts close enough together to create a hazard. A heavy beam of 3 inches or more thickness could be used without encroachment on the right-of-way clearance lines because there was space of enough depth on the truck to take such a large member.

However, on certain equipment which is planned for use on such mixed trackage the trucks are provided with so much mechanism that it is not possible to use the ordinary shoe assembly supporting arrangements. Specifically, there is a diesel engine drive for the inboard axle, an electric motor drive for the outboard axle, the motor being mounted on the truck between axles, disk brake mechanism mounted between axles, hand brake rigging, and other equipment.

According to the present invention the shoe assembly is supported directly on a journal box and, although the space between the journal box cap and the right-of-way clearance lines is very small, in some cases restricting the shoe mechanism mounting support to approximately ½ inch over the box cap anchorage, the mounting provided by the present invention has both the necessary strength and the required insulating characteristics to adequately serve the intended purposes. This is accomplished by making the support of a reinforced plastic, such as fiber glass and a plastic, forming it in such shape that it constitutes a complete insulating and flash shield, and embedding and covering the attaching elements and spatially separating them to such an extent that there is no chance of creating a stray current path through the shielding support. The mounting also includes a modified journal box cap or adapter and connections for supporting the flash mounting shield to provide a strong mooring with the necessary resilience to inhibit breakage and the necessary non-conducting characteristics to furnish material aid in achieving safe electrical insulation.

The objects and advantages of the invention will be apparent from the following description of an exemplary embodiment, reference being made to the accompanying drawings thereof, wherein:

Fig. 1 is a top plan view of a rail car truck provided with third rail shoe mounting and operating mechanism embodying the present invention, this mechanism being shown at both ends of the motor driven axle of a single truck although it is to be noted that one of the mechanisms might be mounted on the other truck;

Fig. 2 is an enlarged side elevation of the mounting assembly for one shoe at the box end of one axle journal, the view being taken on the line 2—2 of Fig. 1;

Fig. 3 is a horizontal section taken on the line 3—3 of Fig. 2;

Fig. 4 is a transverse vertical section taken on the line 4—4 of Fig. 2;

Fig. 5 is an enlarged partial vertical transverse section taken on the line 5—5 of Fig. 2;

Fig. 6 is an enlarged partial vertical transverse section taken on the line 6—6 of Fig. 2;

Fig. 7 is an enlarged vertical transverse section taken on the line 7—7 of Fig. 2; and Fig. 8 is an enlarged partial vertical transverse section taken on the line 8—8 of Fig. 2.

In the embodiment illustrated a truck 10 includes a frame 11 having side frame elements 12 and cross transoms 13, wheel-axle units 14 with wheels 15 and axles 16, brake disks 17, and journal boxes 18.

The inboard axle is driven by a diesel engine as through a fluid drive mechanism in the same casing, a flexible drive shaft 24 and a "Spicer" gear drive unit 25 mounted on the axle for relative rotation therewith. The outboard axle is driven by an electric motor 26 mounted on the rotatable axle and on a transom 13 between axles, the mounting being the subject of another copending application.

At the inboard end a brake frame 27 carries braking mechanisms 28 at the ends for cooperation with the adjacent brake disks 17 on the axles. At the outboard end the brake mechanisms 29 are carried on the sides of the motor casing.

The third rail shoe operating and mounting means with which the present invention is concerned are secured on the diagonally opposite journal boxes of the wheel-axle units. The equipment at each journal box is generally designated by the numeral 30. Since the equipment at each side of the truck (or car, if on different trucks) is the same the following description will be directed to one unit.

The usual journal box cap is replaced by a special cap 31 which is secured to the journal box by the usual cap screws (not shown). The cap is provided with a plurality of integral lugs or ears 33 having holes 34 in which are secured mounting bolts 35 of a flash mounting board or panel 36. Insulating resilient bushings 37 of a rubber or rubber-like material are squeezed around the edges of the holes when the nuts 38 are tightened on the bolts. In the initial assembly stage the rubber bushing or doughnut 37, having a single thick flange head 40 and carried on an integrally bonded inner metal sleeve 41, is of such a predetermined length that when washers 42 are placed and the nut 38 is tightened the doughnut is squeezed to form another and smaller end flange 43 as the washers bring up against the ends of the sleeve 41. The change in length is figured so as to place the proper compression on the rubber.

It is to be noted from Fig. 6 that the doughnuts, top and bottom, are so placed that compression due to the weight of parts supported thereby falls on the thick original flanges 40 of the doughnuts. At the top the thick flange is disposed on the inner side of the journal cap 31 and at the bottom it is disposed on the outer side.

The heads 35a of the bolts 35 have each secured thereto an extensive reinforcing washer or flange 35b and the entire head is deeply embedded and completely covered in the plastic material of which the mounting flash board 36 is formed. The major thickness of the board is disposed on the under side of the bolt heads to provide the necessary supporting strength and the thinner portion, though still of considerable thickness, is disposed in a bulge over the tops of the bolt heads to fully insulate them from all metal parts which may be mounted on the outer side of the board.

Disposed in general vertical alignment with the board supporting bolts 35 but spaced a sufficient distance from them to insure adequate electrical insulation between, there are provided two sets of equipment mounting bolts 46 which secure to the mounting panel the shoe mounting and operating equipment. This equipment is well known but will be described briefly herein to show how the mounting means provided hereby performs its requirements.

The bolts 46, in two groups of three, have a plate 47 secured beneath their heads 46a and the heads and plates are buried in the plastic material of the board, the greater thickness being on the outer side and raised as a protuberance over the rounded outer surfaces of the heads of the bolts to provide full insulation, as for the bolts 35.

Immediately, the bolts 46 firmly secure by their nuts 48 a base plate 49 carrying clamp bolts 50 which by their nuts 51 adjustably secure a mounting frame 52. At the points of attachment the base and mounting frame are roughened, as by transverse ribbings 53 and the mounting frame is provided with vertical slots 54 for the bolts 50.

The mounting frame 52 is provided with bearing brackets 55 in which is mounted a shaft 56. The shaft 56 carries fast thereon two longitudinally spaced arms 57 on which is rigidly secured a shoe supporting shaft 58. A third rail shoe plate 59 is provided with arms 60 which are turnably mounted on the shaft 58. The shoe itself 61 is secured adjustably to the plate 59 by bolts 62. On the shaft 58 there are mounted coil torsion springs 63 each having outwardly extending upper and lower ends 64 and 65. These protruding ends pass on opposite sides of stub pins 66 carried by the arms 57 and also on opposite sides of projections 67 formed on the shoe plates 59. The arrangement provides resilient movement of the shoe on the shaft 58 in either direction from a central position and also turning movement about the axis of shaft 56.

At one end beyond the adjacent bracket 55 the shaft 56 has rigidly secured thereto an arm 70. To a pivot pin 71 carried by the arm 70 there is connected an operating link 72 which is bifurcated at each end, 72a lower and 72b upper, and which at its intermediate cross bar 72c has secured thereto the piston rod 73. At its upper end the piston rod 73 is connected by a pivot pin 74 to a piston 75 which operates in a power cylinder 76. The cylinder is provided with ears 77 by which it is secured to an extension 78 of the mounting frame 52 by bolts 79.

The piston 75 is urged upward by a coil spring 80 and is returned by the spring to its upward position without the need of fluid pressure in the power cylinder whenever the piston operated linkage is released from a latching mechanism which will now be described.

The upper bifurcated end 72b of the link 72 is connected by pivot pins 83 to latch links 84 which are slotted at 85 the receive these pivot pins. The links 84 at the other end are connected by pivot pins 86 to the bifurcated ends 87a of a latch lever 87 which is turnably mounted on a pivot pin 88 carried by depending ears 89 of the cylinder 76. The latch lever 87 carries a tripping arm 87b which is adapted to move up beneath the end of a piston rod 90 of the piston of a latch release cylinder 91 when the rail shoe has been moved down to operating position by the main fluid power device (piston 75 and cylinder 76). A coil torsion spring 92 carried on the pivot pin 88 acts against the arm 87b to urge the lever 87 to an over-center locking position of lever 87 and links 84 as related to the axis centers of pins 83, 86 and 88. When the fluid operated release device 91 is energized and the piston rod 90 pushed down the locking toggle position is broken by moving the axis of pin 86 on the other side of the axis center connecting line of pins 83 and 88 and the power spring 80 returns the shoe to its off or inoperative position.

In its operative position the shoe 61, due to the slots 85 in the links 84, can be pulled down by the third rail against the return spring 80 below its normal position without disturbing the latched-down condition which is established when the power piston is forced down by fluid pressure action.

The mounting board 36 around the perimeter is provided with an outwardly extending flange 95 of considerable width except at the bottom edge, where it is narrower to clear operating parts, to stiffen and strengthen the board and to assist in preventing flash-over between metal parts mounted outside the board and metal parts on the car. Near the bottom the board 36 is inclined inward below the end of the journal box cap to provide room for the shoe and its operating mechanism and to furnish additional rigidity and strength.

A flexible, preferably a flat woven conductor 96 is clamped to the shoe by bolts 62 and is clamped to a terminal post 98 on the mounting frame 52 by bolts 99, suitable insulation from the frame being provided. The conductor connected between the terminal post 98 and the cable and control system on the car is not shown.

It is thus seen that the invention provides a relatively small strong mounting for the third rail shoe and its operating mechanism; which has adequate insulating effect to electrically isolate the metal parts mounted on the board from the metal parts on the car; and which by utilizing a mounting on the end of a journal box attains a place for support when otherwise none is available.

Fig. 4 shows in full lines the shoe and its supporting elements in operating position and in broken lines shows the shoe in raised position to stand behind the minimum clearance right-of-way line which is encountered at certain places. It is no part of the present invention but it is to be noted that automatic means are available for raising the shoe when restricted clearance space is encountered. The present invention provides support for this shoe mounting and operating means. When the shoe is raised it engages an insulated movement limiting stop (not shown) and in this position just barely clears the nearest part of the clearance line. The mounting and operating means for the shoe and the adapter cap 31 are of such dimensions in order to satisfy their requirements that only a very thin space is left for the mounting board 36 and its anchorages. After the resilient anchorages are provided there is actually less than one-half inch allowable over the end of the journal box for the thickness of the mounting board. Yet tthe board is designed within this range of thickness to provide the strength necessary to take the loads and shocks of the shoe, provide the necessary electrical insulation, and avoid flash-overs to the metal parts of the truck. The present mounting by its shape, reinforcements, stiffening outstanding margin flange and high inherent strength has been found adequate in service to meet these exacting requirements and to give long-continued satisfactory service.

While one embodiment of the invention has been described in detail for purposes of illustration, it will be evident that there may be various embodiments and modifications within the general scope of the invention.

What is claimed is:

1. A mounting for a third rail shoe and its operating mechanism on a railway truck having a frame, fore and aft wheel-axle and disk brake units, and axle journal boxes, the truck and its equipment being such that space for shoe mountings between the journal boxes longitudinally and between the truck parts and the right-of-way clearance lines transversely is inadequate to permit the reception of shoe supporting means and where the space between the journal boxes and right-of-way clearance lines is very limited, comprising in combination with the truck frame and journal boxes, a metal anchorage cap secured over the end of a journal box, a molded reinforced plastic insulating shoe-mechanism mounting board, bolts having resilient insulating sleeves in said cap securing the mounting board to said cap, said bolts having heads at the outer side of said mounting board integrally covered with plastic material, and bolts extending through said mounting board with their heads integrally covered with plastic material at the inner side of said mounting board securing the shoe operating mechanism on the outer side of said mounting board, said mounting board being of an area sufficiently extensive to completely cover the cap and completely back the shoe operating mechanism and being of such thinness that all of the shoe operating mechanism lies behind the right-of-way clearance lines, said board having an integral marginal outwardly extending stiffening and flash baffling flange completely surrounding the shoe operating mechanism, said marginal flange lying behind the outermost portions of the shoe operating mechanism.

2. A mounting as set forth in claim 1, further characterized by the fact that said board mounting bolts and said shoe operating mechanism mounting bolts are arranged in approximate vertical alignment and that said board is reinforced by plastic-encased metal plate elements in the zones of said bolts.

3. A mounting as set forth in claim 1, wherein said mounting board is inclined inward in its lower portion behind the shoe location to provide added space and additional rigidity and strength to the mounting board.

References Cited in the file of this patent

UNITED STATES PATENTS

| | | |
|---|---|---|
| 885,836 | Bullock | Apr. 28, 1908 |
| 985,430 | McCoubrie | Feb. 28, 1911 |
| 1,766,639 | Howe | June 24, 1930 |
| 1,833,002 | Smith | Nov. 24, 1931 |
| 2,190,952 | Rossman | Feb. 20, 1940 |
| 2,198,489 | Snyder | Apr. 23, 1940 |
| 2,735,042 | Hayford | Feb. 14, 1956 |